United States Patent
Yamada (10) Patent No.: US 10,210,442 B2
(45) Date of Patent: Feb. 19, 2019

(54) IMAGE FORMING SYSTEM, IMAGE FORMING APPARATUS, POST-PROCESSING APPARATUS, AND METHOD OF CONTROLLING THE SAME, AND COMPUTER READABLE RECORDING MEDIUM

(71) Applicant: Konica Minolta, Inc., Tokyo (JP)

(72) Inventor: Kenichi Yamada, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/436,521

(22) Filed: Feb. 17, 2017

(65) Prior Publication Data

US 2017/0243095 A1 Aug. 24, 2017

(30) Foreign Application Priority Data

Feb. 18, 2016 (JP) .................................. 2016-029323

(51) Int. Cl.
*G06F 15/00* (2006.01)
*G06K 15/00* (2006.01)

(52) U.S. Cl.
CPC ....... *G06K 15/4065* (2013.01); *G06K 15/408* (2013.01); *G06K 15/4025* (2013.01)

(58) Field of Classification Search
CPC ............. G06K 15/4065; G06K 15/408; G06K 15/4025
USPC ............................................... 358/1.15, 1.14
See application file for complete search history.

(56) References Cited

U.S. PATENT DOCUMENTS

2001/0031150 A1* 10/2001 Shimada ................ G03G 15/50
399/82
2012/0206764 A1* 8/2012 Fujii .................... G03G 15/234
358/1.15

FOREIGN PATENT DOCUMENTS

| CN | 102135738 A | 7/2011 |
| JP | 2006-023475 A | 1/2006 |

OTHER PUBLICATIONS

Office Action issued in corresponding Chinese Patent Application No. 201710080607.9 dated Oct. 9, 2018, with translation (21 pages).

* cited by examiner

*Primary Examiner* — Neil R McLean
*Assistant Examiner* — Darryl V Dottin
(74) *Attorney, Agent, or Firm* — Osha Liang LLP (57) ABSTRACT

An image forming system identifies a user's operation for changing a set value related to a processing of the image forming apparatus or the post-processing apparatus. When the set value is changed during a continuous output operation of the image forming system, the image forming system causes the image forming apparatus and the post-processing apparatus to continue the continuous output operation while reflecting the changed set value. The image forming system Detects a predetermined change related to the processing by referring back to a time when the user's operation is identified, and causes the image forming apparatus and the post-processing apparatus to re-output papers that have been output from a time when the predetermined change occurred to a time when the changed set value was reflected.

13 Claims, 8 Drawing Sheets

| NUMBER OF SHEETS | 47 | 48 | 49 | 50 | 51 | 52 | 53 | 54 | 55 |
|---|---|---|---|---|---|---|---|---|---|
| OPERATION | | | | | B INPUT | | | | |
| SET VALUE | A | A | A | A | A | A | B | B | B |
| TRAY | 1 | 1 | 2 | 2 | 2 | 2 | 2 | 2 | 2 |
| DETERMINATION | OK | OK | NG | NG | NG | NG | OK | OK | OK |

| NUMBER OF COPIES | 48 | 49 | 50 | 51 | ... | 78 | 79 | 80 | 81 |
|---|---|---|---|---|---|---|---|---|---|
| OPERATION | | | B INPUT | | | | | C INPUT | |
| SET VALUE | A | A | A | B | ... | B | B | B | C |
| ENVIRONMENT | 1 | 2 | 2 | 2 | ... | 2 | 3 | 3 | 3 |
| DETERMINATION | OK | NG | NG | OK | ... | OK | NG | NG | OK |

| NUMBER OF COPIES | 49 | 50 | 51 | 52 | 53 | 54 | 55 | 56 | 57 |
|---|---|---|---|---|---|---|---|---|---|
| OPERATION | | | | B INPUT | | C INPUT | | | |
| SET VALUE | A | A | A | A | B | B | C | C | C |
| JOB | 1 | 1 | 2 | 2 | 2 | 2 | 2 | 2 | 2 |
| DETERMINATION | OK | OK | NG | NG | NG | NG | OK | OK | OK |

| NUMBER OF SHEETS | 47 | 48 | 49 | SAMPLE | 50 | 51 | 52 | 53 | 54 |
|---|---|---|---|---|---|---|---|---|---|
| OPERATION | | | | | B INPUT | | | | |
| SET VALUE | A | A | A | A | A | A | B | B | B |
| ENVIRONMENT | 1 | 1 | 2 | 2 | 2 | 2 | 2 | 2 | 2 |
| DETERMINATION | OK | OK | NG | NG | NG | NG | OK | OK | OK |

IMAGE FORMING SYSTEM, IMAGE FORMING APPARATUS, POST-PROCESSING APPARATUS, AND METHOD OF CONTROLLING THE SAME, AND COMPUTER READABLE RECORDING MEDIUM

CROSS REFERENCE TO RELATED APPLICATION

This application is based on Japanese Patent Application No. 2016-029323 filed on Feb. 18, 2016, the contents of which are incorporated herein by reference.

BACKGROUND

1. Technical Field

The present invention relates to an image forming system, an image forming apparatus, a post-processing apparatus, and a method of controlling the same, and a computer readable recording medium.

2. Description of Related Art

There is an image forming system including an image forming apparatus which forms an image on a paper and a post-processing apparatus which performs a post-processing on a paper on which an image is formed by the image forming apparatus. The image forming apparatus and the post-processing apparatus perform an image forming processing and a post-processing, respectively, in accordance with set values of a variety of items related to the image forming processing and the post-processing.

Regarding this, Japanese Unexamined Patent Application Publication No. 2006-023475 discloses a technique in which, when an image forming system stops operation, a user changes set values of a variety of items related to the image forming processing or the post-processing to adjust an output object. According to this technique, a user makes fine adjustments of set values of a variety of items to thereby obtain a more favorable output object.

Incidentally, in an image forming system, normally, a continuous output operation in which an linage forming apparatus continuously forms an image on a plurality of papers and a post-processing apparatus performs a post-processing on a paper is conducted. When a user checks a condition (a finished quality of the post-processing or an image quality) of an output object and finds a difference from a predetermined condition during the continuous output operation, the user first stops the continuous output operation of the image forming system. The user changes a set value of a related item, and then resumes the continuous output operation of the image forming system. In addition, the user-counts the number of output objects (waste papers) which have a difference from a predetermined condition and instructs the image forming system to re-output the counted number of output objects in order to make the image forming system re-output output objects.

However, a user's task of counting the number of output objects which have a difference from a predetermined condition and instructing re-output needs time and effort, which causes decrease in the productivity of the image forming system. For this reason, the productivity of the image forming system can be improved by reducing a user's task when the user finds an abnormality of an output object during the continuous output operation of the image forming system.

SUMMARY

One or more embodiments of the present invention provide an image forming system, an image forming apparatus, a post-processing apparatus, and a method of controlling the same, and a computer readable recording medium, which enable the productivity to be improved by reducing a user's task when the user finds an abnormality of an output object during the continuous output operation.

One or more embodiments of an image forming system includes an image forming apparatus which forms an image on a paper and a post-processing apparatus which performs a post-processing on a paper on which an image is formed by the image forming apparatus, and includes a processor or CPU configured to: identify a user's operation for changing a set value related to a processing of the image forming apparatus or the post-processing apparatus; when the set value is changed during a continuous output, operation in which the image forming apparatus continuously forms an image on a plurality of papers and the post-processing apparatus performs a post-processing on the paper, make the image forming apparatus and the post-processing apparatus continue the continuous output operation reflecting the changed set value; detect a predetermined change related to the processing by referring back to a time when the user's operation is identified (i.e., referring back to a reference point in time when the user's operation is identified); and make the image forming apparatus and the post-processing apparatus re-output papers which have been output from a time when the prede termined change was occurred to a time when the changed set value was reflected.

In one or more embodiments of the image forming system, the predetermined change includes a change which causes a paper size variation.

In one or more embodiments of the image forming system, the predetermined change includes a change of a paper feed tray which supplies a paper to the image forming apparatus.

In one or more embodiments of the image forming system, the predetermined change includes a change of a paper lot.

In one or more embodiments of the image forming system, the predetermined change includes a change of a surrounding environment of the image forming apparatus and the post-processing apparatus.

In one or more embodiments of the image forming system, the predetermined change includes a change of an image forming job.

In one or more embodiments of the image forming system, the CPU makes the image forming apparatus and the post-processing apparatus re-output, for an output object which is output in a unit of a sheet, a paper per sheet, and makes the image forming apparatus and the post-processing apparatus re-output, for an output object which is output in a paper bundle unit composed of a plurality of sheets, papers in the paper bundle unit.

In one or more embodiments of the image forming system, the CPU is configured to determine whether the amount of change of the set value is in an allowable range or not, and the CPU does not make the image forming apparatus and the post-processing apparatus re-output a paper when the amount of change is determined to be in the allowable range.

In one or more embodiments of the image forming system, the CPU is configured to set the allowable range based on a user's operation.

In one or more embodiments of the image forming system, the user's operation for changing a set value is a button operation for starting an operation for changing the set value.

In one or more embodiments of the image forming system, the user's operation for changing a set value is a button operation for inputting the changed set value.

Features, and characteristics of this invention other than those set forth above will become apparent from the description given herein below with reference to embodiments illustrated in the accompanying drawings.

DETAILED DESCRIPTION

Embodiments of the present invention will be described in detail with reference to the accompanying drawings.

(First Example)

Figure 1:
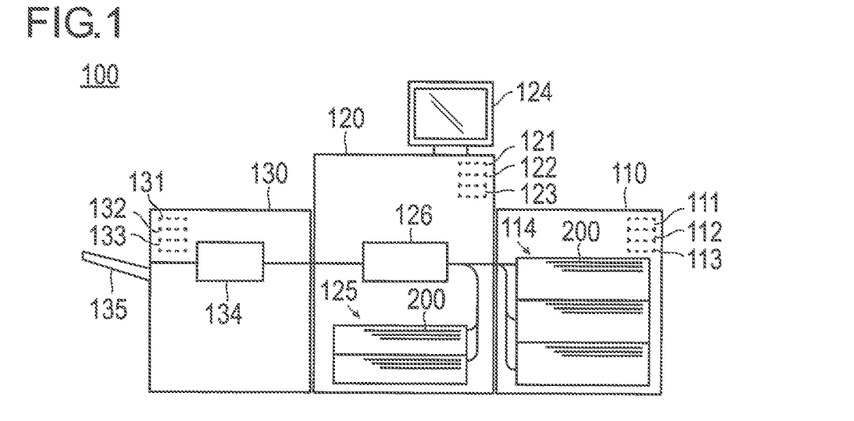
FIG. 1 is a diagram showing a schematic configuration of an image forming system according to one or more embodiments of the present invention.
Figure 2:
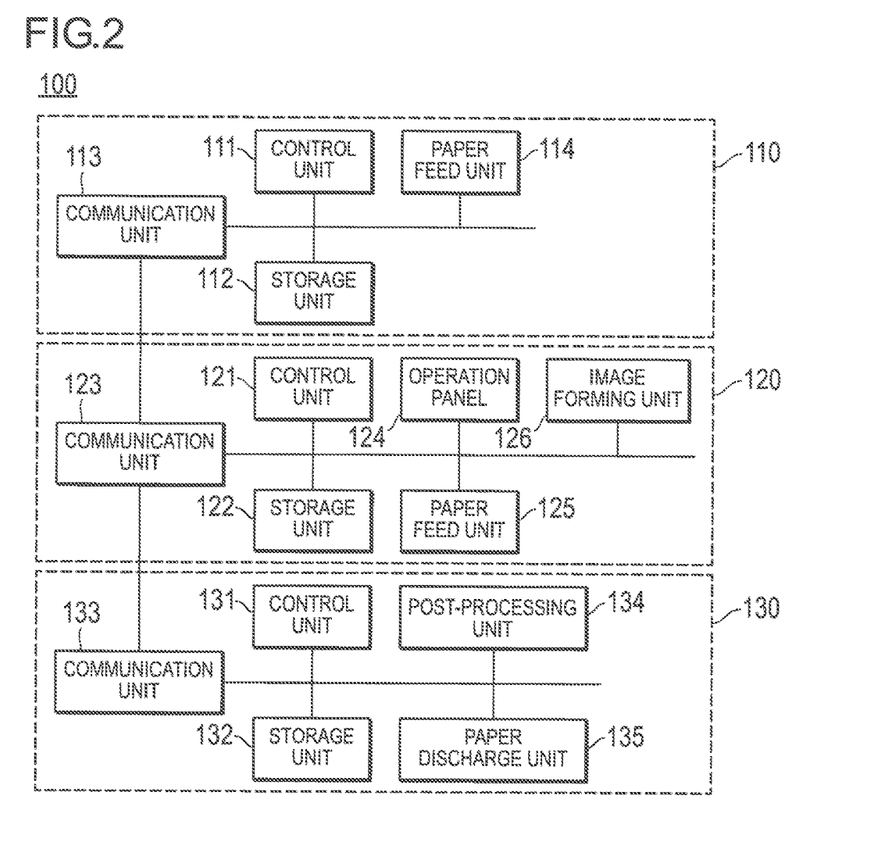
FIG. 2 is a block diagram showing a schematic configuration of a paper feed apparatus, an image forming apparatus, and a post-processing apparatus.

FIG. 1 is a diagram showing a schematic configuration of an image forming system 100 according to one or more embodiments of the present invention, and FIG. 2 is a block diagram showing a schematic configuration of a paper feed apparatus 110, an image forming apparatus 120, and a post-processing apparatus 130.

As shown in FIGS. 1 and 2, the image forming system 100 includes the paper feed apparatus 110, the image forming apparatus 120, and the post-processing apparatus 130. The paper feed apparatus 110, the image forming apparatus 120, and the post-processing apparatus 130 are serially connected from upstream to downstream of paper conveyance. Hereinafter, the image forming apparatus 120, the paper feed apparatus 110, and the post-processing apparatus 130 will be described in the order.

<Image Forming Apparatus>

The image forming apparatus 120 includes a control unit 121, a storage unit 122, a communication unit 123, an operation panel 124, a paper feed unit 125, and an image forming unit 126, which are mutually connected via a bus for signal communication.

The control unit 121 is a CPU (Central Processing Unit), which performs control of each of the above-described units or a variety of arithmetic processing.

The storage unit 122 is composed of a ROM (Read Only Memory) for storing a variety of programs or a variety of data in advance, a RAM (Random Access Memory) for temporarily storing a program or data as a workspace, a hard disk for storing a variety of programs or a variety of data, or the like.

The communication unit 123 is an interface for communicating with another device, and transmits or receives a set value, a variety of signals necessary for controlling operation timing, or the like with the paper feed apparatus 110 and the post-processing apparatus 130.

The operation panel 124 includes a touch panel, a numeric keypad, a start button, a stop button, or the like, and is used for displaying a variety of information and for inputting a variety of instructions.

The paper feed unit 125 stores a paper 200 used for printing. The paper feed unit 125 includes a plurality of paper feed trays, and feeds the paper 200 stored in a paper feed tray to the image forming unit 126 one by one.

The image forming unit 126 forms an image which is based on a variety of data on the paper 200, using an electrophotographic process including steps of electrification, exposure, development, transfer, and fixing. The paper 200 on which an image is formed by the image forming unit 126 is conveyed to the post-processing apparatus 130.

<Paper Feed Apparatus>

The paper feed apparatus 110 includes a control unit 111, a storage unit 112, a communication unit 113, and a paper feed unit 114, which are mutually connected via a bus for signal communication. Since the above-described units of the paper feed apparatus 110 have similar functions to the above-described units of the image forming apparatus 120, the description thereof will be omitted.

<Post-Processing Apparatus>

The post-processing apparatus 130 includes a control unit 131, a storage unit 132, a communication unit 133, a post-processing unit 134, and a paper discharge unit 135, which are mutually connected via a bus for signal communication. Description of units, among the above-described units of the post-processing apparatus 130, having similar functions to the above-described units of the image forming apparatus 120 will be omitted.

The post-processing unit 134 performs a post-processing on the paper 200 conveyed from the image forming apparatus 120. Examples of the post-processing include a stapling process for stapling a paper bundle, a punching process for making a hole for filing at an end portion of a paper, and a folding process for folding a paper. The paper discharge unit 135 sends the paper 200 which has passed through the post-processing unit 134 to the outside of the post-processing apparatus 130.

The control unit 121 of the image forming apparatus 120 in cooperation with the control unit 131 of the post-processing apparatus 130, serves as first and second control units configured to control operations of the image forming apparatus 120 and the post-processing apparatus 130. The control unit 121 of the image forming apparatus 120 executes a program stored in the storage unit 122, thereby serving as a identification unit configured to identify or recognize a user's operation for changing a set value related to a post-processing or the like and a detection unit configured to detect a predetermined change by referring back to the time when the user's operation is identified. Specific processing contents of each unit will be described below.

The paper feed apparatus 110, the image forming apparatus 120, and the post-processing apparatus 130 may each include a component other than the above-described components, or exclude a portion of the above-described components.

In the image forming system 100 configured as described above, a continuous output operation in which the image forming apparatus 120 continuously forms an image on a plurality of papers and the post-processing apparatus 130 performs a post-processing on a paper is conducted. When a user finds an abnormality (for example, a displacement of a folding position) of an output object during a continuous output operation of the image forming system 100, a user can change a set value of a related item without stopping the continuous output operation of the image forming system 100. When a set value is changed by a user's operation, the image forming system 100 continues the continuous output operation reflecting the changed set value, and then performs re-output for the output object having the abnormality. Hereinafter, an operation of the image forming system 100 will be described in detail with reference to FIGS. 3 to 9.

Figure 3:
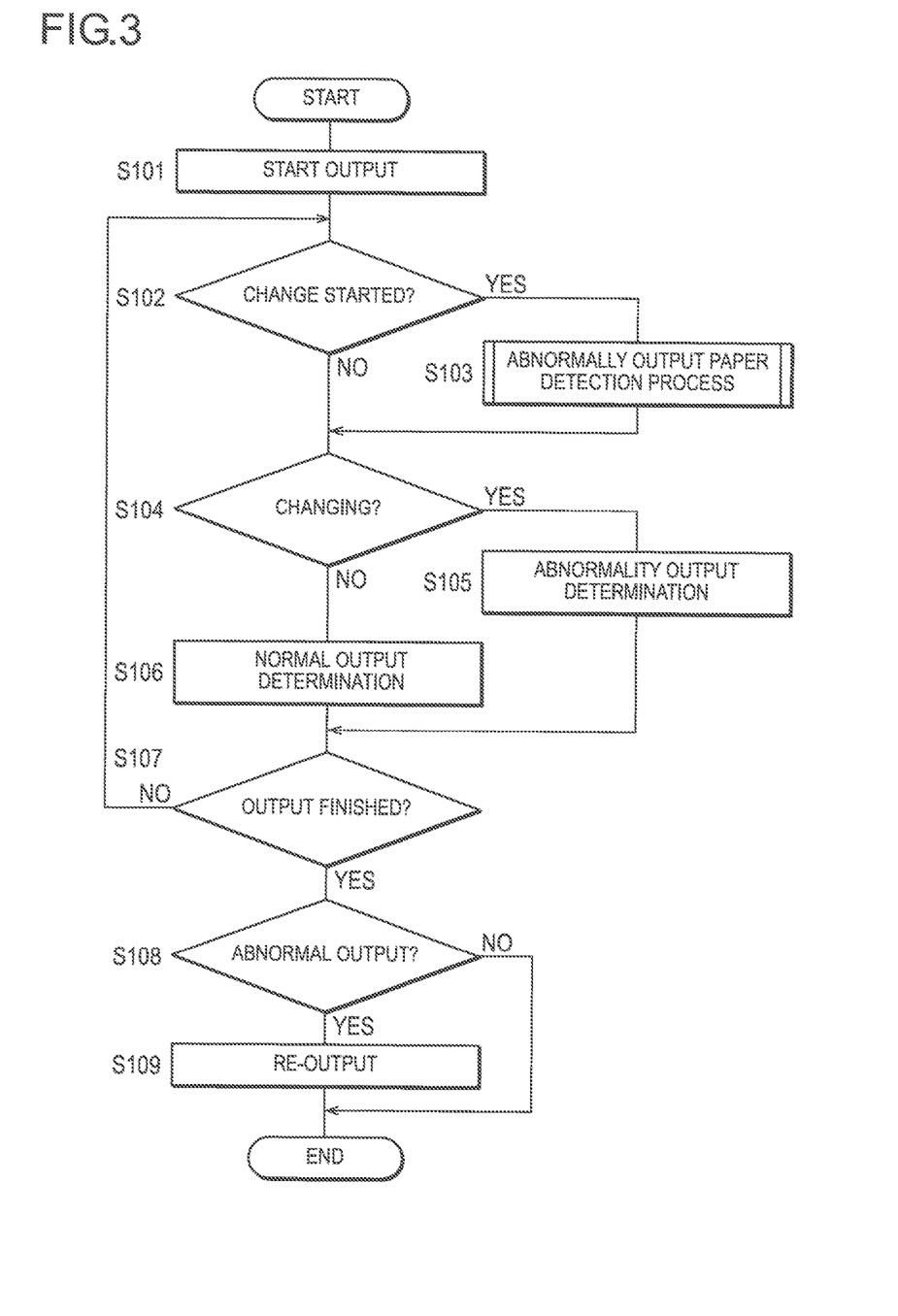
FIG. 3 is a flow chart showing a procedure of a printing process.

FIG. 3 is a flow chart showing a procedure of a printing process executed by the image forming system 100.

First, the image forming system 100 starts output (step S101). More specifically, the control unit 121 of the image forming apparatus 120 controls the image forming apparatus 120 and the post-processing apparatus 130 to start a continuous output operation in which the image forming apparatus 120 continuously forms an image on a plurality of papers and the post-processing apparatus 130 performs a post-processing on a paper. During a continuous output operation of the image forming system 100, a user checks a condition (finished quality of a post-processing or the like) of an output object which is discharged to the paper discharge unit 135. When a user finds a difference of a condition of an output object from a predetermined condition, a user changes a set value of a related item through the operation panel 124 of the image forming apparatus 120.

Next, the image forming system 100 determines whether a change of a set value is started or not (step S102). More specifically, the control unit 121 of the image forming system 100 determines whether the first button operation of a series of button operations performed when a user changes a set value through the operation panel 124 is identified or not. In one or more embodimentswhen the first button operation is identified, the control unit 121 determines that a change of a set value is started.

When it is determined that a change of a set value is not started (step S102: NO), the image forming system 100 goes to a process of step S104. On the other hand, when it is determined that a change of a set value is started (step S102: YES), the image forming system 100 executes an abnormally output paper detection process (step S103). More specifically, the control unit 121 of the image forming apparatus 120 executes an abnormally output paper detection process which detects an abnormally output paper by referring back to the time when a change of a set value is started.

Figure 4:
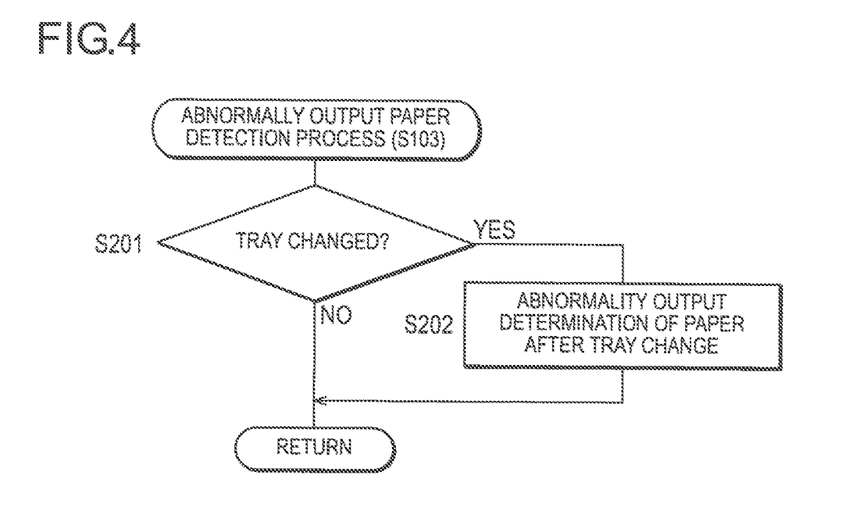
FIG. 4 is a flow chart showing a procedure of an abnormally output paper detection process.

FIG. 4 is a flow chart showing a procedure of an abnormally output paper detection process.

First, the control unit 121 determines whether a paper feed tray was changed or not (step S201). More specifically, the control unit 121 determines whether a paper feed tray which supplies a paper to the image forming apparatus 120 was changed or not, by referring back to the time when a change of a set value is started.

When it is determined that a paper feed tray was not changed (step S201: NO), the control unit 121 finishes the process. On the other hand, when it is determined that a paper feed tray was changed (step S201: YES), the control unit 121 determines that a paper after a paper feed tray was changed is an abnormally output paper (step S202), and finishes the process. More specifically, the control unit 121 determines that a paper output from the time when a paper feed tray was changed to the time when a change of a set value was started is an abnormally output paper, and finishes the process. Here, information about a paper which is determined to be an abnormally output paper is stored in the storage unit 122 for a subsequent re-output processing.

As described above, according to the abnormally output paper detection process shown in step S103, a change of a paper feed tray is detected by referring back to the time when a change of a set value is started. A paper output from the time when a paper feed tray was changed to the time when a change of a set value was started is determined to be an abnormally output paper.

On the other hand, when it is determined that a change of a set value is not started in a process described in step S102 (step S102: NO), the image forming system 100 determines whether the set value is being changed or not (step S104). More specifically, the control unit 121 of the image forming apparatus 120 determines whether a current status of the image forming system 100 is from the time when a change of a set value is started to the time when the changed set value is reflected in the image forming apparatus 120 or the post-processing apparatus 130. When a set value is changed, the control unit 121 of the image forming apparatus 120, as the first control unit, reflects the changed set value without stopping a continuous output operation and makes the image forming apparatus 120 and the post-processing apparatus 130 continue a continuous output operation.

When it is determined that a set value is being changed (step S104: YES), the image forming system 100 determines that a paper currently being output is an abnormally output paper (step S105). More specifically, the control unit 121 of the image forming apparatus 120 determines that a paper currently being output from the image forming system 100 is an abnormally output paper. According to processes described in steps S104 to S105, a paper which is output from the time when a change of a set value is started to the time when the changed set value is reflected is determined to be an abnormally output paper. Information about a paper which is determined to be an abnormally output paper is stored in the storage unit 122 for a subsequent re-output processing.

On the other hand, when it is determined that a set value is not being changed in a process described in step S104 (step S104: NO), the image forming system 100 determines that a paper currently being output is a normally output paper (step S106). More specifically, the control unit 121 of the image forming apparatus 120 determines that a paper currently being output from the image forming system 100 is a normally output paper.

Next, the image forming system 100 determines whether output is finished or not (step S107). More specifically, the control unit 121 of the image forming apparatus 120 determines whether output of the last paper is finished or not for a continuous output operation started in a process described in step S101.

When it is determined that the output is not finished (step S107: NO), the image forming system 100 returns to a process of step S102. The image forming system 100 then repeats processes of step S102 and subsequent steps until the output is finished.

On the other hand, when it is determined that the output is finished (step S107: YES), the image forming system 100 determines whether there is an abnormally output paper or not (step S108). More specifically, the control unit 121 of the image forming apparatus 120 determines whether there is a paper which is determined to be an abnormally output paper in processes described in step S103 and S105 or not. When a set value is not eventually changed although a change of a set value is started, the control unit 121 determines that there is not an abnormally output paper.

When it is determined that there is not an abnormally output paper (step S108: NO), the image forming system 100 finishes the process. On the other hand, when it is determined that there is an abnormally output paper step S108: YES), the image forming system 100 re-outputs an abnormally output paper (step S109), and finishes the process. More specifically, the control unit 121 of the image forming apparatus 120, as the second control unit, controls the image forming apparatus 120 and the post-processing apparatus 130 to re-output a paper determined to be an abnormally output paper in processes described in steps S103 and S105, and finishes the process.

As described above, according to a process of a flow chart shown in FIG. 3, when, for example, a set value related to a post-processing is changed during a continuous output operation of the image forming system 100, the changed set value is reflected and a continuous output operation is continued. In this case, an abnormally output paper is detected by referring back to a reference point in time before the start of the change in the set value, and an abnormally output paper is re-output.

Figure 5:
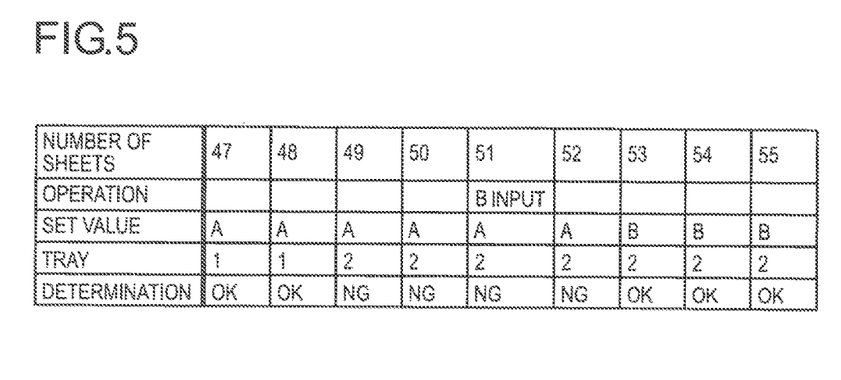
FIG. 5 is a diagram showing one example of a printing process.
Figure 6:
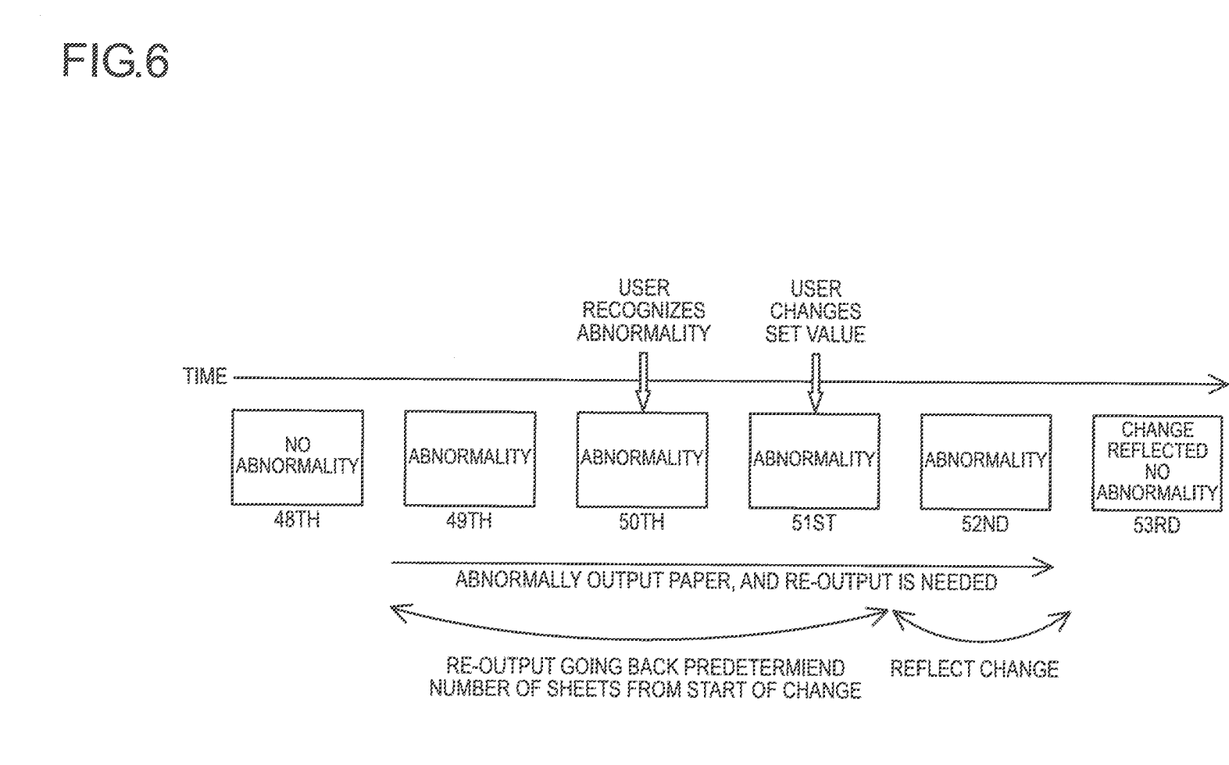
FIG. 6 is a diagram showing one example of a printing process.

Next, the above-described printing process will be described more specifically with reference to FIGS. 5 and 6. FIGS. 5 and 6 are each a diagram showing one example of a printing process according to one or more embodiments.

FIGS. 5 and 6 show a case in which the image forming system 100 executes a print job in which 100 sheets of A4 size papers are each folded in three and output.

Assume that a user finds that there is a displacement of a folding position of the 50th paper when the image forming system 100 performs a continuous output operation of 100 sheets of papers, starts a change of the folding position during outputting the 51st paper, and changes a set value "A" to a set value "B". In this case, the image forming system 100 reflects the changed set value "B" without stopping a continuous output operation, and continues the continuous output operation. As the result, for example, a folding process is performed in the set value "A" to the 52nd paper, and a folding process is performed in the set value "B" from the 53rd paper.

When a set value is changed, the control unit 121 of the image forming apparatus 120 detects a change of a paper feed tray by referring back to the time when a change of a set value is started. When a paper feed tray was changed from the first tray "1" to the second tray "2" between the 48th paper and the 49th paper, the control, unit 121 then determines that the 49th to 51st papers output from the time when a paper feed tray was changed to the time when a change of a set value was started are abnormally output papers. In addition, the control unit 121 determines that the 52nd paper output from the time when a change of a set value was started to the time when the changed set value "B" was reflected is also an abnormally output paper. On the other hand, the control unit 121 determines that the first to 48th and the 53rd to 100th papers are normally output papers.

When output of 100 sheets of papers is finished, the control unit 121 of the image forming apparatus 120 controls the image forming apparatus 120 and the post-processing apparatus 130 to re-output the 49th to 52nd papers which are determined to be abnormally output papers. According to such a configuration, even when a user finds an abnormality of an output object during a continuous output operation of the image forming system 100, there is no need for a user to count the number of output objects having an abnormality and to instruct the image forming system 100 to re-output.

Figure 7:
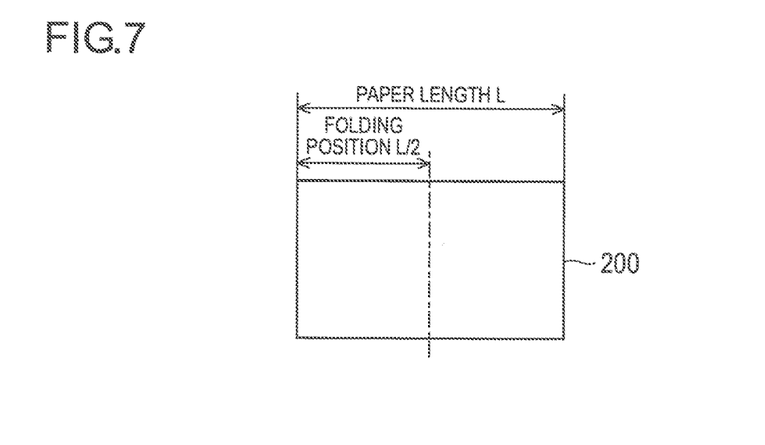
FIG. 7 is a diagram for explaining a folding process of a paper.
Figure 8:
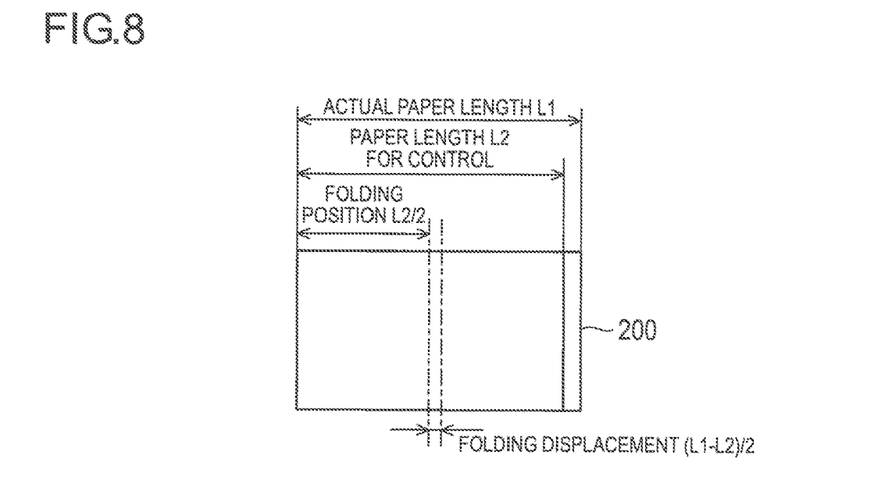
FIG. 8 is a diagram for explaining a folding displacement of a paper.
Figure 9:
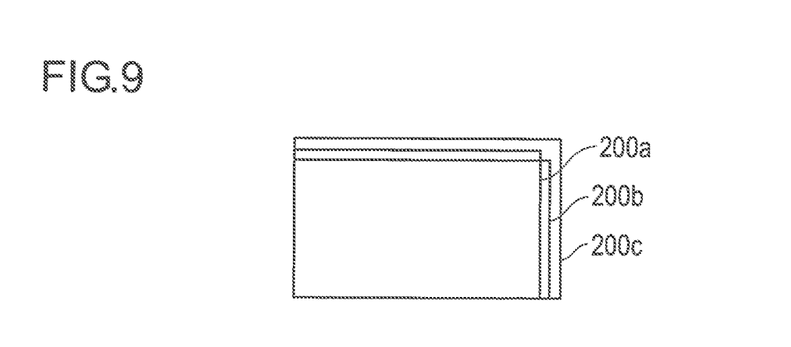
FIG. 9 is a diagram for explaining paper size variations due to paper lots.

Hereinafter, a cause of an abnormality in a finished quality of a post-processing such as a folding process will be described with reference to FIGS. 7 to 9.

When the post-processing apparatus 130 folds a paper, the post-processing apparatus 130 determines a folding position of the paper with reference to paper type information and size information. For example, as shown in FIG. 7, when the paper 200 is folded in two, a folding position (L/2) is determined based on a length L of the paper 200, and the paper 200 is folded at the determined folding position. However, as shown in FIG. 8, the actual length L1 of the paper 200 is slightly different from a control length L2 obtained from size information of the paper. For this reason, a folding displacement is occurred in an output object of the image forming system 100 depending on a difference between the control length L2 of the paper and the actual length L1 of the paper 200. Since the length of a paper has an allowable error (for example, ±1.5 to 3.0 mm) in accordance with a standard, the actual length L1 of the paper 200 varies depending on a paper lot. For example, as shown in FIG. 9, different lots of papers 200a, 200b, and 200c have different lengths, which causes a displacement of a folding position.

Therefore, when a user finds that there is a displacement in a folding position of a paper and starts a change of a set value, the image forming system 100 of one or more embodiments determines whether a paper lot was changed or not by determining whether a paper feed tray was changed or not. When a paper feed tray was changed, it is determined that a displacement of a folding position was occurred from the time when a paper feed tray was changed, and a paper output from the time when a paper feed tray was changed to the time when a change of a set value was started is determined to be an abnormally output paper to perform re-outputting. Further, a paper output from the time when a change of a set value was started to the time when the changed set value was reflected is also determined to be an abnormally output paper to perform re-outputting.

As described above, according to the image forming system 100 of one or more embodiments, when a user finds an abnormality of an output object and starts a change of a set value during a continuous output operation of the image forming system 100, a change of a paper feed tray is detected by referring back to a reference point in time before the start of the chance in the set value. A paper output from the time when a paper feed tray was changed to the time when the changed set value was reflected is then re-output. According to such a confiauration, even when a user finds an abnormalitv of an output object during a continuous output operation of the image forming system 100, there is no need for a user to count the number of output objects having an abnormality and to instruct the image forming system 100 to re-output. As a result, a user's operation is reduced, which improves productivity of the image forming system 100.

In addition, according to the image forming system 100 of one or more embodiments, a set value is changed without stopping a continuous output operation of the image forming system 100, and a continuous output operation is continued reflecting the changed set value. According to such a configuration, a post-processing or the like is not performed in vain at a set value which has not been changed on all papers which have been fed at the time when a user instructs to stop a continuous output operation, unlike the case in which a user stops the continuous output operation to change the set value. Therefore, the number of abnormally output papers can be reduced compared with the case in which a continuous output operation of the image forming system 100 is stopped to change a set value.

(Modified Examples)

In the above-described embodiment, when it is determined that a paper feed tray was not changed in an abnormally output paper detection process shown in FIG. 4, the control unit 121 of the image forming apparatus 120 finishes a process without determining that a paper output before a change of a sat value was started is an abnormally output paper. However, when it is determined that a paper feed tray was not changed in the abnormaliy output paper detection process, the control unit 121 of the image forming apparatus 120 may determine that all papers output before a change of a set value was started are abnormally output papers.

In the above-described embodiment, whether a paper lot was changed or not is determined by determining whether a paper feed tray was changed or not assuming that papers of the same lot are stored in one paper feed tray. However, when papers of a plurality of lots are stored in one paper feed tray, whether a paper lot was changed or not is directly determined, for example, by counting the number of paper in a paper feed tray. When a change of a paper feed tray is detected as in the above-described embodiment, not only paper size variations caused by a change of a paper lot can be detected, but also a deformation (curl) of a paper caused by a difference of the shape of a conveyance route of a paper for each paper feed tray can be detected. Deformation of a paper can be a cause of an abnormality of an output object.

(Second Example)

In the above first example of one or more embodiments, as a cause of an abnormality of an output object, a change of a paper feed tray has been focused on. In a second example of one or more embodiments, as a cause of an abnormality of an output object, a change of an environment (a temperature and humidity) will be focused on.

Figure 10:
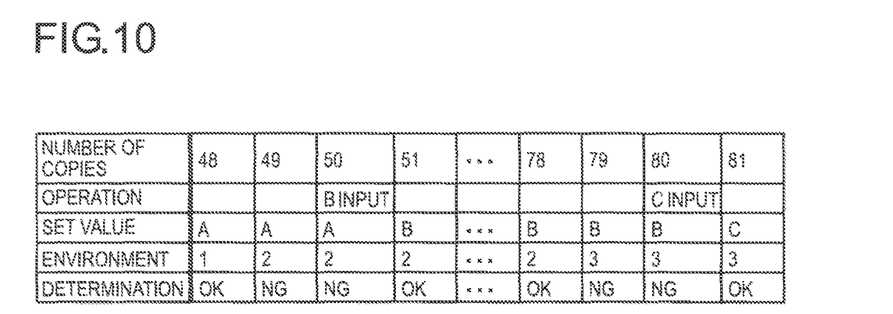
FIG. 10 is a diagram showing one example of a printing process according to one or more embodiments of the present invention.

FIG. 10 is a diagram showing one example of a printing process according to one or more embodiments. FIG. 10 shows a case in which an image forming system 100 executes a print job in which a punching process is performed on an A4 size paper, a unit of ten sheets of papers is side-stitched, and 100 copies thereof are output. Since the configuration of the image forming system 100 itself is similar to that of the first embodiment, the description thereof will be omitted.

Assume that a user finds that there is a displacement of a punch position in a paper of the 49th copy when the image forming system 100 performs a continuous output operation of 100 copies, and has changed a set value of a punch position from "A" to "B" during the output of the 50th copy. In this case, the image forming system 100 continues a continuous output operation reflecting the changed set value "B", and a punching process is performed at a set value "B", for example, from a paper of the 51st copy.

When a set value is changed, the control unit 121 of the image forming apparatus 120 detects a change of an environment by referring back to the time when a change of a set value is started. Here, a change of an environment is, for example, a change of a surrounding temperature of the image forming system 100 from the time when a continuous output operation is started by not less than 2° C., or a change of a surrounding humidity by not less than 7%, which is set in advance. In FIG. 10, a case in which an environment is changed from the first condition "1" to the second condition "2" or a case in which an environment is changed from the second condition "2" to the third condition "3" corresponds to the above-described change of an environment.

In one or more embodiments, a control unit 121 first detects a change of an environment from the first condition "1" to the second condition "2" by referring back to the time when a change of a set value is started. The control unit 121 then determines that papers of the 49th and 50th copies output from the time when the environment was changed from the first condition "1" to the second condition "2" to the time when the changed set value "B" was reflected are abnormally output papers.

In addition, in one or more embodiments, as shown in FIG. 10, it is assumed that a user again finds that there is a displacement of a punch position in a paper of the 79th copy, and changes a set value from "B" to "C" during the output of the 80th copy. In this case, the image forming system 100 continues a continuous output operation reflecting the changed set value "C", and a punching process is performed at a set value "C", for example, from a paper of the 81st copy.

When a set value is changed again, the control unit 121 of the image forming apparatus 120 detects a change of an environment, from the second condition "2" to the third condition by referring back to the time when a change of a set value is started again. The control unit 121 then determines that papers of the 79th and 80th copies output from the time when an environment was changed from the second condition "2" to the third condition "3" to the time when the changed set value "C" was reflected are abnormally output papers. After finishing the output of 100 copies, the control unit 121 of the image forming apparatus 120 controls the image forming apparatus 120 and the post-processing apparatus 130 to re-output the 49th, 50th, 79th, and 80th copies.

When an environment is not changed to the third condition "3" on the way and remains to be the second condition "1" the control unit 121 of the image forming apparatus 120 determines that papers of the 49th to 80th copies are abnormally output papers and performs re-outputting. In one or more embodiments, a punching process is performed for each paper, and re-outputting is performed for abnormally output papers in a unit (copy unit) of a bundle of ten sheets of the papers which is a unit of a side-stitching process.

As described above, according to the image forming system 100 of one or more embodiments, when a user finds an abnormality of an output object and starts a change of a set value during a continuous output operation of the image forming system 100, a change of an environment is detected by referring back to a reference point in time before the start of the change in the set value. A paper output from the time when a change of an environment was occurred to the time when the changed set value was reflected is then re-output. According to such a configuration, there is no need for a user to count the number of output objects having an abnormality and to instruct the image forming system 100 to re-output, which reduces a user's operation and improves productivity.

Hereinafter, a cause of an abnormality in a finished quality of a post-processing due to a change of an environment will be described with reference to FIG. 11.

Figure 11:
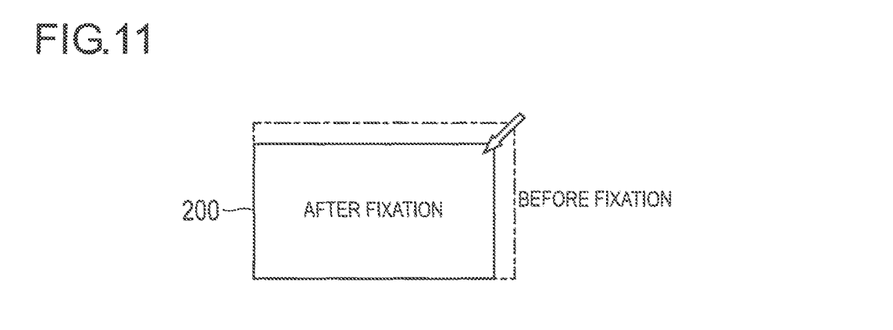
FIG. 11 is a diagram for explaining paper size variations due to a fixing step.

As shown in FIG. 11, when an image is formed on a paper 200 by the image forming apparatus 120, the paper 200 shrinks when it is dried in a fixing step of a toner image. Here, the degree of shrinkage of a paper is influenced by a type of the paper, an image on the paper, and surrounding environments (a temperature and humidity). For example, the larger the image on the paper is the less likely the moisture in the paper is lost, whereby the paper is less likely to shrink. Alternatively, under an environment in which a temperature and humidity are high, much moisture remains in the paper even after a fixing step, whereby the degree of shrinkage of the paper is small. Therefore, in the image forming system 100 of one or more embodiments, when a user finds that there is a displacement of a punch position in a paper and starts a change of a set value, whether an environment was changed or not is determined. When an environment was changed, it is then determined that a displacement of a punch position was occurred from the time when an environment was changed, and a paper output from the time when an environment was changed to the time when the changed set value was reflected is determined to be an abnormally output paper to perform re-outputting.

(Third Example)

In the above first and second examples of one or more embodiments, a change causing a paper size variation such as a change of a paper feed tray or a change of an environment has been focused on. In a third example of one or more embodiments, a change other than a change causing a paper size variation is focused on.

Figure 12:
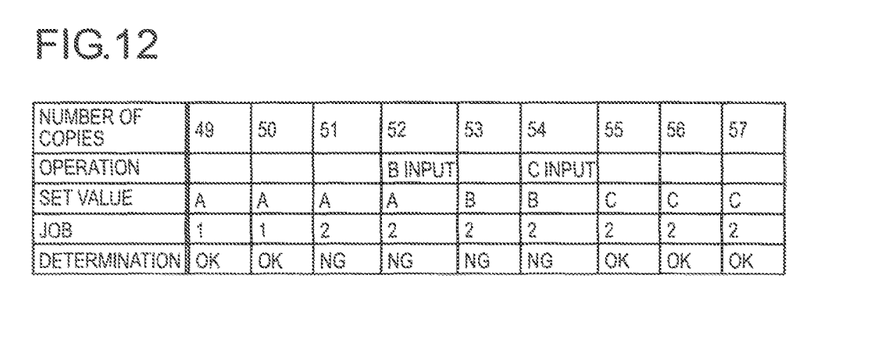
FIG. 12 is a diagram showing one example of a printing process according to one or more embodiments of the present invention.

FIG. 12 is a diagram showing one example of a printing process according to one or more embodiments of the present invention.

FIG. 12 shows a case in which an image forming system 100 executes a first print job in which 50 copies, each of which is saddle stitched in a unit of three sheets of A4 size papers, are output and a second print job in which 50 copies, each of which is saddle stitched in a unit of five sheets of A4 size papers, are output. Since the configuration of the image forming system 100 itself is similar to that of the first embodiment, the description thereof is omitted.

Assume that a user finds that there is a displacement of a folding position in the 51st copy when the image forming system 100 performs a continuous output operation of 100 copies in total, and has changed a set value of a folding position from "A" to "B" during the output of the 52nd copy. In this case, the image forming system 100 continues a continuous output operation reflecting the changed set value "B", and a folding process is performed at a set value "B", for example, from the 53rd copy.

When a set value is changed, the control unit 121 of the image forming apparatus 120 detects a change of a print job by referring back to the time when a change of a set value is started. The control unit 121 then determines that papers of the 51st and 52nd copies output from the time when the print job was changed from the first print job "1" to the second print job "2" to the time when the changed set value "B" was reflected are abnormally output papers.

In addition, in one or more embodiments, as shown in FIG. 12, it is assumed that a user determines that a displacement of a folding position in the 53rd copy is not sufficiently dissolved, and changes a set value of the folding position from "B" to "C" during the output of the 54th copy. In this case, the image forming system 100 continues a continuous output operation reflecting the changed set value "C", and a folding process is performed at a set value "C", for example, from the 55th copy.

When a set value is changed again, the control unit 121 of the image forming apparatus 120 detects a change of a print job by referring back to the time when a change of a set value is started again. The control unit 121 then determines that paper's of the 51st to 54th copies output from the time when a print job was changed from the first print job "1" to the second print job "2" to the time when the changed set value "C" was reflected are abnormally output papers. After finishing the output of 100 copies, the control unit 121 of the image forming apparatus 120 controls the image forming apparatus 120 and the post-processing apparatus 130 to re-output the 51st to 54 th copies. When a print job is changed during a continuous output operation in which the post-processing apparatus 130 performs a folding process, and the number of papers to be folded is changed, a displacement of a folding position of a paper can be occurred.

As described above, according to the image forming system 100 of one or more embodiments, when a user finds an abnormality of an output object and starts a change of a set value during a continuous output operation of the image forming system 100, a change of a print job is detected by referring back to a reference point in time before the start of the change in the set value. A paper output from the time when a print job was changed to the time when the changed set value was reflected is then re-output. According to such a configuration, there is no need for a user to count the number of output objects having an abnormality and to instruct the image forming system 100 to re-output, which reduces a user's operation and improves productivity.

(Fourth Example)

Next, a fourth example of one or more embodiments of the present invention will be described with reference to FIG. 13. The fourth example is an example in which an abnormally output paper is not re-output.

Figure 13:
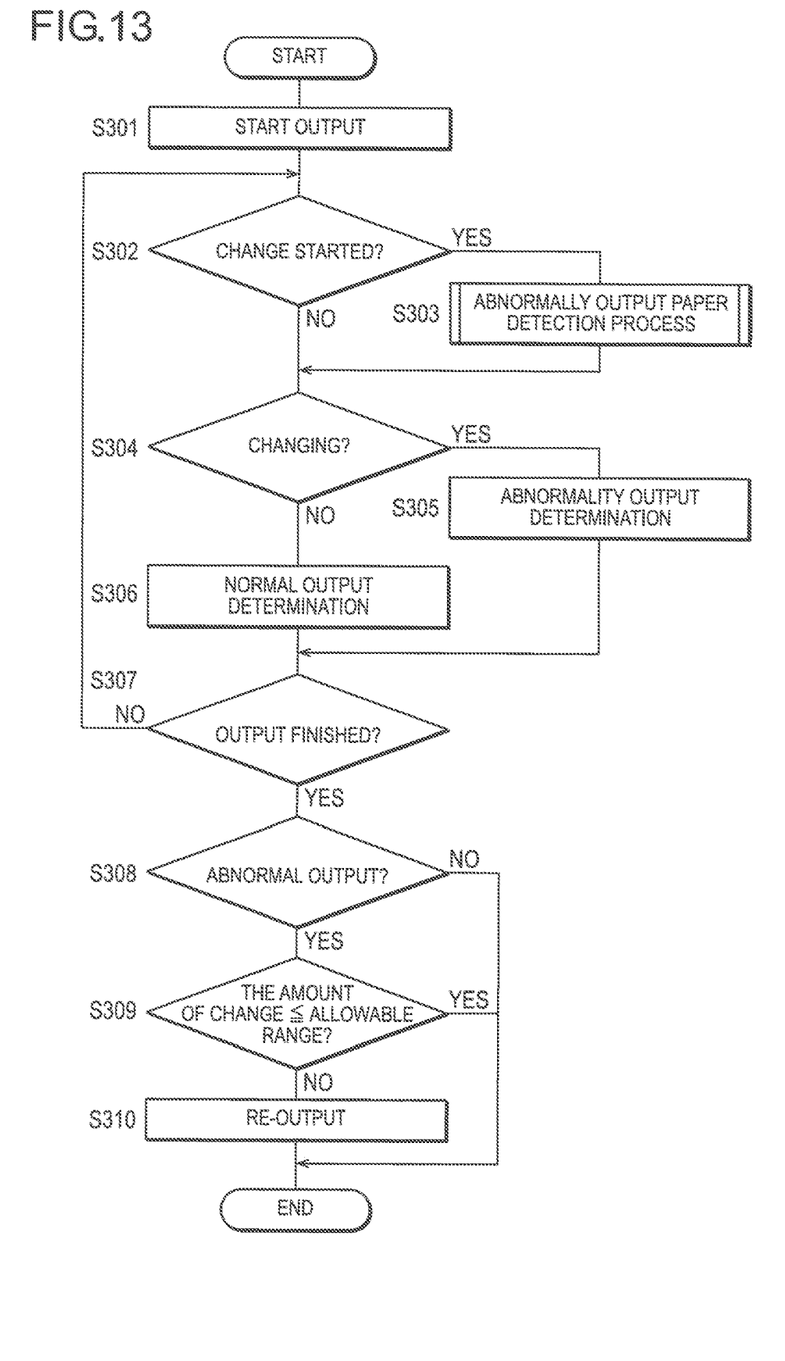
FIG. 13 is a flow chart showing a procedure of a printing process according to one or more embodiments of the present invention.

FIG. 13 is a flow chart showing a procedure of a printing process according to one or more embodiments. Since the configuration of the image forming system 100 according to one or more embodiments itself is similar to the configuration according to the first embodiment, the description thereof will be omitted. In one or more embodiments, the control unit 121 of the image forming apparatus 120 executes a program stored in a storage unit 122, thereby serving as a determination unit configured to determine whether the amount of change of a set value is in an allowable range or not, and a setting unit configured to set an allowable range based on a user's operation.

Since processes described in steps S301 to S30S are similar to the processes described in steps S101 to S108, the description thereof will be omitted.

When it is determined that there is an abnormally output paper in a process described in step S308 (step S308: YES), the image forming system 100 then determines whether the amount of change of a set value is in an allowable range or not (step S309). More specifically, the control unit 121 of the image forming apparatus 120 determines the amount of displacement obtained by converting the amount of a change of the changed set value from a value immediately before the change into a length is within a predetermined allowable range (for example, ±1 mm) or not. An allowable range can be set by a user through an operation panel 124 of the image forming apparatus 120 while taking a guaranteed precision or the like into account.

When it is determined that the amount of change of a set value is outside the allowable range (step S309: NO), the image forming system 100 re-outputs an abnormally output paper (step S310), and finishes the process. On the other hand, when it is determined that the amount of change of a set value is within the allowable range (step S309: YES), the image forming system 100 does not re-output an abnormally output paper, and finishes the process.

As described above, according to a process of a flow chart shown in FIG. 13, when, for example, a set value related to a post-processing is changed during a continuous output operation of the image forming system 100, a continuous output operation is continued reflecting the changed set value. In this case, an abnormally output paper is detected by referring back to a reference point in time before the start of the change in the set value, and when the amount of change of a set value is outside an allowable range, an abnormally output paper is re-output. On the other hand, when the amount of change of a set value is in an allowable range, an abnormally output paper is not re-output. According to such a configuration, an unnecessary re-output is prevented.

(Fifth Example)

Next, a fifth example of one or more embodiments of the present invention will be described with reference to FIGS. 14 and 15. The fifth example is an example in which a set value related to an image forming processing is changed.

Figure 14:
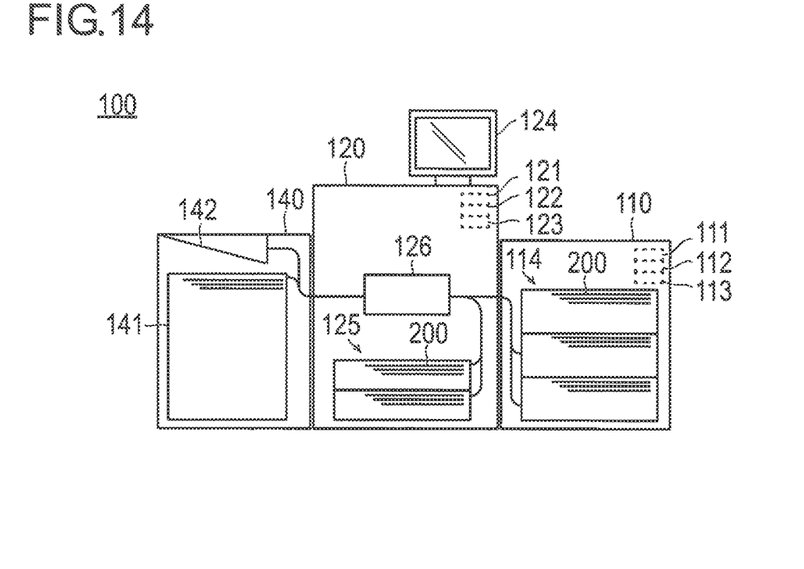
FIG. 14 is a diagram showing a schematic configuration of an image forming system according to one or more embodiments of the present invention.

FIG. 14 is a diagram showing a schematic configuration of an image forming system 100 according to one or more embodiments.

As shown in FIG. 14, the image forming system 100 of one or more embodiments includes a paper feed apparatus 110 an image forming apparatus 120, and a stacker apparatus 140. The paper feed apparatus 110, the image forming apparatus 120, and the stacker apparatus 140 are serially connected from upstream to downstream of paper conveyance. Since the configurations of the paper feed apparatus 110 and the image forming apparatus 120 are similar to those of the first embodiment, description of the paper feed apparatus 110 and the image forming apparatus 120 will be omitted.

The stacker apparatus 140 includes a housing unit 141 and a paper discharge unit 142. The housing unit 141 stores a paper 200 which is discharged from the image forming apparatus 120. The paper discharge unit 142 sends the paper 200 which is discharged from the image forming apparatus 120 to the outside of the stacker apparatus 140.

Figure 15:
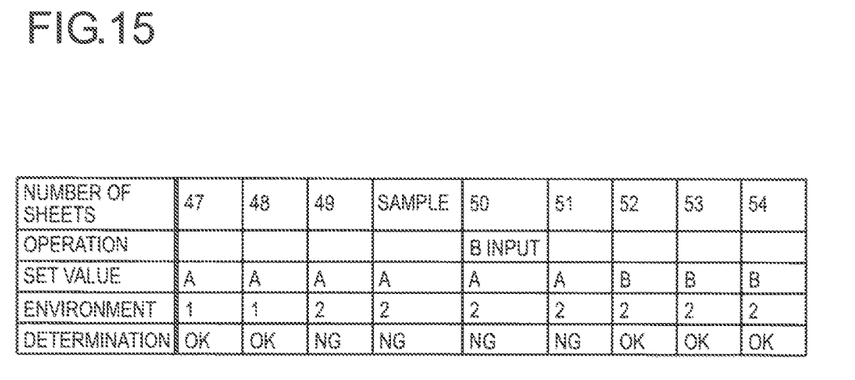
FIG. 15 a diagram showing one example of a printing process.

FIG. 15 is a diagram showing one example of a printing process according to one or more embodiments. FIG. 15 shows a case in which the image forming apparatus 120 executes a print job in which 100 sheets of A4 size papers are output.

Assume that a user finds that there is an abnormality of an image quality (concentration or the like) for a sample paper discharged between the 49th and 50th papers when the image forming apparatus 120 performs a continuous output operation of 100 sheets, and changes a set value of an item related to an image quality from "A" to "B" during outputting the 50th paper. In this case, the image forming apparatus 120 continues a continuous output operation reflecting the changed set value "B", and an image forming processing is performed at the set value "B", for example, from the 52nd paper.

When a set value is changed, the control unit 121 of the image forming apparatus 120 detects a change of an environment by referring back to the time when a change of a set value is started. The control unit 121 then determines that the 49th to 51st papers output from the time when an environment was changed from the first condition "1" to the second condition "2" to the time when the changed set value "B" was reflected are abnormally output papers. After finishing output of 100 papers, the control unit 121 controls the image forming apparatus 120 to re-output the 49th to 51st papers (excluding a sample paper). When an environment is changed during a continuous output operation of the image forming apparatus 120, an image quality can be changed.

According to such a configuration, even when a user finds an abnormality of an output object during a continuous output operation of the image forming apparatus 120, there is no need for a user to count the number of output objects having an abnormality and to instruct the image forming apparatus 120 to re-output. As a result, a user's operation is reduced, which improves productivity of the image forming apparatus 120.

The present invention is not limited to the above-described embodiments, and may be modified in various forms within the scope of the claims.

For example, in the above-described first to fifth examples of one or more embodiments, a process in which the control unit 121 of the image forming apparatus 120 detects a change of a paper feed tray or the like is performed by referring back to a reference point in time at the time when a change of a set value is started (in other words, at the time when a first button operation for changing a set value is identified). However, the timing for the control unit 121 to perform a process of detecting a predetermined change by going back to the past is not limited to the time when a change of a set value is started, and may be the time when a set value is input. In this case, when, for example, an eventual button operation for inputting the changed set value among a series of button operations performed when a user changes a set value through the operation panel 124 is identified, the control unit 121 detects a change of a paper feed tray or the like by referring back to a reference point in time before the start of the change in the set value.

In the above-described first to fifth examples of oxie or more embodiments, an abnormally output paper is re-output after finishing output for a continuous output operation. However, the timing for re-output ting of an abnormally output paper is not limited to when the output is finished. For example, an abnormally output paper may be re-output immediately after the changed set value is reflected to the image forming apparatus 120 or the post-processing apparatus 130.

In the above-described first to fourth examples of one or more embodiments, an item related to a post-processing has been described taking a folding position of a folding process or a punch position of a punching process as an example. However, an item related to a post-processing is not limit thereto, and examples thereof also include an amount of curl, an amount of glue to be applied, and the strength of forming a flat back in a bookbinding process. An item related to an image forming processing is not limited to an image quality, and examples thereof also include a position of an image formed on a paper.

In the above-described first to fourth examples of one or more embodiments, the control unit 121 of the image forming apparatus 120 executes an abnormally output paper detection process to control the image forming system 100. However, the control unit 131 of the post-processing apparatus 130 may execute an abnormally output paper detection process. In this case, the control unit 131 of the post-processing apparatus 130 serves as the above-described identification unit, first control unit, detection unit, and second control unit. The abnormally output paper detection process may be executed by a control apparatus other than the image forming apparatus 120 and the post-processing apparatus 130.

In the above-described first to fourth examples of one or more embodiments, deserption has been made taking a case in which an image forming apparatus and a post-processing apparatus are divided as an example. However, the image forming apparatus and the post-processing apparatus may be an integrated apparatus.

The above-described first to fifth examples of one or more embodiments may be executed in combination. For example, when the first example and the second example of one or more embodiments are executed in combination, both a change of a paper feed tray and a change of an environment are detected in an abnormally output paper detect ion process by referring back to a reference point in time before a start of a change in a set value by a user.

The units and the methods for performing the various kinds of processes in the image forming system according to each of the above-described first to fifth example of one or more embodiments can be embodied by either an exclusive hardware circuit or a programmed computer. The program may be provided, for example, by a computer readable recording medium such as a CD-ROM (Compact Disc Read Only Memory), or may be provided online through a network such as the Internet. In this case, the program stored in the computer readable recording medium is usually transferred and stored into a storage unit such as a hard disk. In addition, the program may be provided as independent application software or may be incorporated, as one function of the image forming system, into software of the image forming system.

Furthermore, one or more embodiments of the invention may be implemented as a method of controlling an image forming system having an image forming apparatus which forms an image on a plurality of papers and a post-processing apparatus that performs a post-processing on the plurality of papers, the method comprising: (a) identifying a user's operation for changing a set value related to a processing of the image forming apparatus or the post-processing apparatus; (b) when the set value is changed during a continuous output operation, causing the image forming apparatus and the post-processing apparatus to continue the continuous output operation while reflecting the changed set value; (c) detecting a predetermined change related to the processing by referring back to a time when the user's operation is identified; and (d) causing the image forming apparatus and the post-processing apparatus to re-output the plurality of papers that have been output from a time when the predetermined change occurred to a time when the changed set value was reflected.

One or more embodiments of the invention may also be implemented as a method of controlling an image forming apparatus which forms an image on a plurality of papers, the method comprising: (a) identifying a user's operation for changing a set value related to an image forming processing of the image forming apparatus; (b) when the set value is changed during a continuous output operation, causing the image forming apparatus to continue the continuous output operation while reflecting the changed set value; (c) detecting a predetermined change related to the image forming processing by referring back to a time when the user's operation is identified; and (d) causing the image forming apparatus to re-output papers that have been output from a time when the predetermined change occurred to a time when the changed set value was reflected.

One or more embodiments of the invention may also be implemented as a method of controlling a post-processing apparatus that performs a post-processing on a plurality of papers on which an image is formed by an image forming apparatus, the method comprising: (a) identifying a user's operation for changing a set value related to a post-processing of the post-processing apparatus; (b) when the set value is changed during a continuous output operation, causing the post-processing apparatus to continue the continuous output operation while reflecting the changed set value; (c) detecting a predetermined change related to the post-processing by referring back to a time when the user's operation is identified; and (d) causing, in cooperation with the image forming apparatus, the post-processing apparatus to re-output papers that have been output from a time when the predetermined change occurred to a time when the changed set value was reflected.

One or more embodiments of the invention may also be implemented as a non-transitory computer readable recording medium stored with a program executed by an image forming system having an image forming apparatus that forms an image on a plurality of papers and a post-processing apparatus that performs a post-processing on the plurality of papers, the program causing a computer to execute a process comprising: (a) identifying a user's operation for changing a set value related to a processing of the image forming apparatus or the post-processing apparatus; (b) when the set value is changed during a continuous output operation, causing the image forming apparatus and the post-processing apparatus to continue the continuous output operation while reflecting the changed set value; (c) detecting a predetermined change related to the processing by referring back to a time when the user's operation is identified; and (d) causing the image forming apparatus and the post-processing apparatus to re-output papers that have been output from a time when the predetermined change occurred to a time when the changed set value was reflected.

Although the disclosure has been described with respect to only a limited number of embodiments, those skilled in the art, having benefit of this disclosure, will appreciate that various other embodiments may be devised without departing from the scope of the invention. Accordingly, the scope of the invention should be limited only by the attached claims.

What is claimed is:

1. An image forming system comprising:
    an image forming apparatus that forms an image on a plurality of sheets;
    a post-processing apparatus that performs a post-processing on the plurality of sheets; and
    a central processing unit (CPU) that:
        identifies a user's operation for changing a set value related to a processing of the image forming apparatus or the post-processing apparatus during a period of time comprising a continuous output operation;
        in response to the set value being changed by the user's operation during the continuous output operation, causes the image forming apparatus and the post-processing apparatus to continue the continuous output operation while reflecting the changed set value;
        detects whether a predetermined change related to the processing has occurred after an output of a sheet that is a predetermined number before a sheet that was output at a time when the user's operation was identified; and causes the image forming apparatus and the post-processing apparatus to re-output the plurality of sheets that have been output from a time when the predetermined change occurred to a time when the changed set value was reflected, wherein the image forming apparatus and the post-processing apparatus re-output the plurality of sheets while reflecting the changed set value.

2. The image forming system as claimed in claim 1, wherein the predetermined change includes a change that causes a sheet size variation.

3. The image forming system as claimed in claim 1, wherein the predetermined change includes a change of a sheet feed tray which supplies the plurality of sheets to the image forming apparatus.

4. The image forming system as claimed in claim 1, wherein the predetermined change includes a change of a sheet lot.

5. The image forming system as claimed in claim 1, wherein the predetermined change includes a change of a surrounding environment of the image forming apparatus and the post-processing apparatus.

6. The image forming system as claimed in claim 1, wherein the predetermined change includes a change of an image forming job.

7. The image forming system as claimed in claim 1, wherein the CPU causes the image forming apparatus and the post-processing apparatus to re-output a sheet one by one when an output object is a sheet to be output one by one, and causes the image forming apparatus and the post-processing apparatus to re-output a bundle of sheets when the output object is a bundle of sheets.

8. The image forming system as claimed in claim 1, wherein the CPU determines whether or not the amount of change of the set value is in an allowable range, and the CPU does not cause the image forming apparatus and the post-processing apparatus to re-output the plurality of sheets when the amount of change is in the allowable range.

9. The image forming system as claimed in claim 8, wherein the CPU sets the allowable range based on the user's operation.

10. The image forming system as claimed in claim 1, wherein the user's operation for changing the set value is a button operation for starting an operation for changing the set value.

11. The image forming system as claimed in claim 1, wherein the user's operation for changing the set value is a button operation for inputting the changed set value.

12. An image forming apparatus that forms an image on a plurality of sheets, comprising:

a central processing unit (CPU) that:
identifies a user's operation for changing a set value related to an image forming processing of the image forming apparatus during a period of time comprising a continuous output operation;
in response to the set value being changed by the user's operation during the continuous output operation, causes the image forming apparatus to continue the continuous output operation while reflecting the changed set value;
detects whether a predetermined change related to the image forming processing has occurred after an output of a sheet that is a predetermined number before a sheet that was output at a time when the user's operation was identified; and
causes the image forming apparatus to re-output the plurality of sheets that have been output from a time when the predetermined change occurred to a time when the changed set value was reflected,
wherein the image forming apparatus re-outputs the plurality of sheets while reflecting the changed set value.

13. A post-processing apparatus that performs a post-processing on a plurality of sheets on which an image is formed by an image forming apparatus, the post-processing apparatus comprising:

a central processing unit (CPU) that:
identifies a user's operation for changing a set value related to a post-processing of the post-processing apparatus during a period of time comprising a continuous output operation;
in response to the set value being changed by the user's operation during the continuous output operation, causes the post-processing apparatus to continue the continuous output operation while reflecting the changed set value;
detects whether a predetermined change related to the post-processing has occurred after an output of a sheet that is a predetermined number before a sheet that was output at a time when the user's operation was identified; and
causes, in cooperation with the image forming apparatus, the post-processing apparatus to re-output the plurality of sheets that have been output from a time when the predetermined change occurred to a time when the changed set value was reflected,
wherein the post-processing apparatus re-outputs the plurality of sheets while reflecting the changed set value.

* * * * *